United States Patent
Wu

(10) Patent No.: US 10,017,690 B2
(45) Date of Patent: Jul. 10, 2018

(54) PHOTOCHROMATIC COMPOSITION FOR 3D PRINTING

(71) Applicant: XEROX CORPORATION, Norwalk, CT (US)

(72) Inventor: Jin Wu, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 429 days.

(21) Appl. No.: 14/724,429

(22) Filed: May 28, 2015

(65) Prior Publication Data

US 2016/0347995 A1  Dec. 1, 2016

(51) Int. Cl.
| | | |
|---|---|---|
| *B33Y 10/00* | (2015.01) | |
| *C09K 11/00* | (2006.01) | |
| *C09K 9/02* | (2006.01) | |
| *B33Y 70/00* | (2015.01) | |
| *B29C 64/106* | (2017.01) | |

(52) U.S. Cl.
CPC .............. *C09K 9/02* (2013.01); *B29C 64/106* (2017.08); *B29K 2995/002* (2013.01); *B33Y 10/00* (2014.12); *B33Y 70/00* (2014.12); *C09K 2211/1466* (2013.01)

(58) Field of Classification Search
CPC ..................................................... C09K 11/00
See application file for complete search history.

(56) References Cited

U.S. PATENT DOCUMENTS

| | | | | |
|---|---|---|---|---|
| 5,883,043 A | * | 3/1999 | Halbrook, Jr. ......... | B41M 3/148 427/152 |
| 8,460,451 B2 | | 6/2013 | Xu et al. | |
| 2001/0012594 A1 | * | 8/2001 | Ri ....................... | G03G 5/0564 430/58.7 |
| 2002/0185035 A1 | * | 12/2002 | Kitagawa ............... | C09D 11/50 106/31.32 |
| 2007/0087564 A1 | * | 4/2007 | Speakman ........... | H01G 9/2031 438/674 |

OTHER PUBLICATIONS

Zhu et al., Spiropyran-Based Photochromic Polymer Nanoparticles with Optically Switchable Luminescence, J. Am. Chem. Soc, 128, 4303-4309 (Year: 2006).*
Zhou et al., Preparation and application of melamine-formaldehyde photochromic microcapsules, Sensors and Actuators B 188, 502-512 (Year: 2013).*
Corns et al., Industrial organic photochromic dyes, Society of Dyers and Colourists, Color. Technol., 125, 249-261 (Year: 2009).*

* cited by examiner

*Primary Examiner* — Francisco W Tschen
(74) *Attorney, Agent, or Firm* — Pillsbury Winthrop Shaw Pittman LLP

(57) ABSTRACT

Compositions relating to three-dimensional (3D) printing. In particular, a photochromatic composition for use in 3D printing comprising a photochrome core with polymeric resin shell disposed thereon and a polymeric component.

21 Claims, No Drawings

PHOTOCHROMATIC COMPOSITION FOR 3D PRINTING

BACKGROUND

The present disclosure relates to three-dimensional (3D) printing. In particular, the present disclosure relates to new materials for 3D printing based on photochromatic compounds.

Fused Deposition Modelling (FDM) is one of the more common modes employed in 3D printing. FDM printers use a thermoplastic filament, which is heated to its melting point and then extruded, layer by layer, to create a three dimensional object. In particular, a thermoplastic material is first extruded into filament, then the filament wire supplies material into a heated nozzle. Molten thermoplastic filament is then extruded from the nozzle and material is disposed in layers. FDM printers use a printing material, which constitutes the finished object, and a support material, which acts as a scaffolding to support the object as it is being printed. It has the benefit of being one of the least expensive and most accessible for 3D printers, especially for industrial prototypes and for the home hobbyist.

The most common printing material for FDM is acrylonitrile butadiene styrene (ABS) which is a thermoplastic and has a glass transition temperature of about 105° C. Another common printing material for FDM is poly-lactic acid (PLA) which is a biodegradable thermoplastic aliphatic polyester derived from renewable resources and has a glass transition temperature 60-65° C. Both ABS and PLA are easily melted and fit into small molds. Although several materials with unique specifications are available, such as PLA and ABS, there is a continuing need for new polymers and polymer combinations to provide a wider selection of specifications and capabilities to address various downstream applications of the resultant printed object. For example, while there are thermochromatic compositions known for use in 3D printing, photochromatic compositions for use in 3D printing are very rare.

Thus, there is a need to provide 3D printing compositions that may provide desirable new properties to the resulting 3D printed object such as the ability to change colors based on light exposure.

SUMMARY

In some aspects, embodiments herein relate to a photochromatic composition for three-dimensional printing, comprising: a photochromatic component have a core-shell structure, wherein the core comprises a photochromic compound and the shell comprises a polymeric resin; and a polymeric component, wherein the photochromatic component is dispersed within the polymeric component.

In some aspects, embodiments herein relate to a photochromatic composition for three-dimensional printing, comprising: a photochromatic component have a core-shell structure, wherein the core comprises a photochromic compound and the shell comprises a polymeric resin; and a polymeric component, wherein the photochromatic component is dispersed within the polymeric component and the photochromatic composition is formed into one or more filaments.

In some aspects, embodiments herein relate to a three-dimensional product comprising the photochromatic composition described above.

In some aspects, embodiments herein relate to methods of 3D printing comprising: providing a photochromatic composition for use in three-dimensional printing comprising: a photochromatic component have a core-shell structure, wherein the core comprises a photochromic compound and the shell comprises a polymeric resin, and a polymeric component, wherein the photochromatic component is dispersed within the polymeric component; extruding the photochromatic composition to provide a filament; and supplying the filament to a heated nozzle to apply the photochromatic composition to a substrate to form three-dimensional object on the substrate.

DETAILED DESCRIPTION

As noted above, while thermochromatic compositions are commonly known for use in 3D printing, photochromatic compositions for use in 3D printing are very rare. Photochromism and thermochromism are defined as the reversible photocoloration of a molecule from exposure to light (electromagnetic radiation) and heat (thermal radiation) based stimuli, respectively.

Embodiments herein provide photochromatic composition which can be used for 3D printing to produce a 3D object that has the capability of changing colors upon exposure to light. The photochromatic composition changes color due to the reversible coloration/de-coloration properties. In particular, ultraviolet (UV) light is used to color the photochrome in the composition, and visible light and/or elevated temperatures (for example, from about 60 to about 200° C.) de-colors the photochrome in the composition. Typically photochromic molecules undergo structural and/or electronic rearrangements when irradiated with UV light that converts them to a more conjugated colored state. In the case of photochromic molecules, the colored state can typically be converted back to the original colorless state by irradiating the molecule with visible light. In some cases, thermal energy can also be used to de-colorize a photochrome. If the interconversion is also capable thermally (through application of heat), as is the case in alkoxy-substituted dithienylethenes, spiropyrans, azabenzenes, Schiff bases and the like, the molecules are classified as both thermochromic and photochromic. Photochromic compounds are bi-stable in absence of light whereas photochromic-thermochromic hybrid compounds can fade in the absence of light through a thermal process to the thermodynamically more stable colorless state.

The photochromatic compositions comprise a photochromatic component comprising a core-shell structure and a polymeric component. In embodiments, the core comprises a photochrome or photochromic compound and the shell disposed over the core comprises a polymeric resin. In particular, the core may be comprised entirely of the photochrome or photochromic compound and the shell be comprised entirely of the polymeric resin. In specific embodiments, the photochrome can be selected from the group consisting of spiropyrans, spirooxazines, diarylenes and related compounds, or azo compounds, and mixtures thereof. In specific embodiments, the polymeric resin used to form the shell can be selected from the group consisting of melamine resin, urea resin, benzoguanamine resin, glycoluril resin, and mixtures thereof. Specifically, photochromism is defined as a reversible transformation in a chemical species between two forms having different absorption spectra by photoirradiation with the following mechanisms:

Spiropyrans

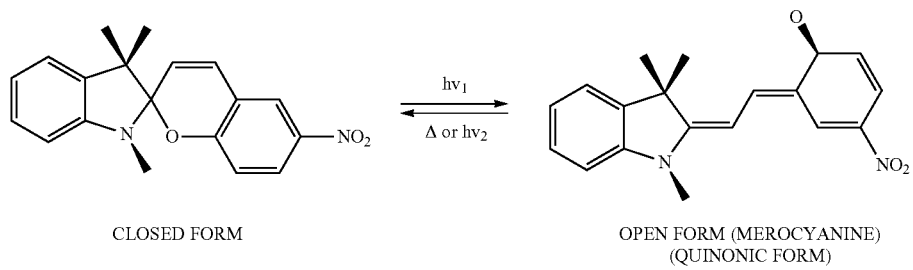

CLOSED FORM                OPEN FORM (MEROCYANINE)
                                (QUINONIC FORM)

Spirooxazines

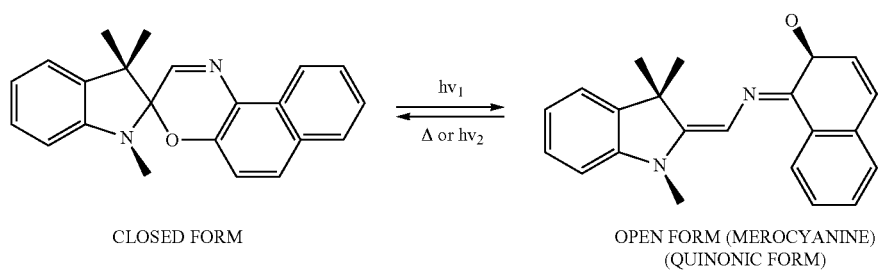

CLOSED FORM                OPEN FORM (MEROCYANINE)
                                (QUINONIC FORM)

Diarylethenes and Related Compounds

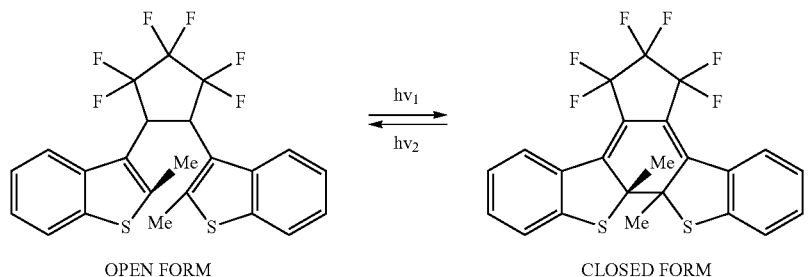

OPEN FORM                      CLOSED FORM

Azo Compounds

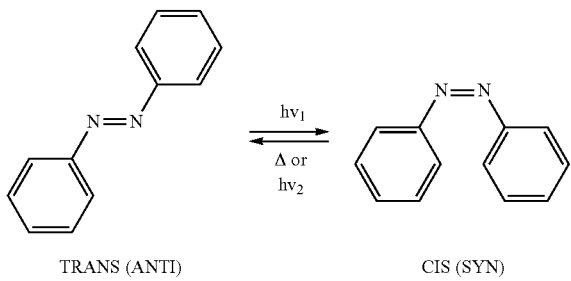 [SMILES: c1ccc(/N=N/c2ccccc2)cc1 ; c1ccc(/N=N\c2ccccc2)cc1]

TRANS (ANTI)                  CIS (SYN)

Because the photochrome is very sensitive to environmental conditions, the shell helps protect the photochromatic core. The shell also allows for an extension to color life of the photochrome. In particular embodiments, the shell comprises a melamine resin. The polymeric resin shell also allows the photochromatic component to chemically bond to the polymeric matrix that is used to disperse the photochromatic component. The strong interaction between the polymeric resin shell and the polymeric matrix not only ensures that the photochromatic component is chemically fixed in polymeric matrix but also in the final 3D printed object (rather than simply being physically blended in the final 3D printed object).

As discussed, the photochromatic composition further comprises a polymeric component (or polymeric matrix) that can be a plastic, such as one selected from the group consisting of ABS, PLA, nylon, polyethylene terephthalate (PET), polyvinyl alcohol (PVA), high impact polystyrene (HIPS), or a wood material such as natural wood or a laywood (a PLA/wood composite), and mixtures thereof. In embodiments, the photochromatic component is extruded together with the polymeric component to form the 3D photochromatic composition. The photochromatic composition may be in the form of a filament or other forms.

In embodiments, the photochromatic core comprises from about 50 to about 99.9 percent, or from about 60 to about 98 percent, or from about 70 to about 95 percent by weight of the total weight of the photochromatic shell-core component. In embodiments, the polymeric shell comprises from about 0.1 to about 50 percent, or from about 2 to about 40 percent, or from about 5 to about 30 percent by weight of the total weight of the photochromatic shell-core component. In embodiments, the photochromatic core-shell component has a particle diameter of from about 100 nm to about 2 µm, or from about 200 nm to about 1 µm, or from about 300 nm to about 800 nm.

The photochromatic component can be combined and extruded with the polymeric component, such as a plastic like ABS, PLA, Nylon, PET, PVA, HIPS, or a wood like natural wood or a laywood (a PLA/wood composite). The PLA, polylactic acid or polylactide, with the following structure has been widely used as the 3D-printed filament material:

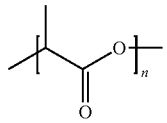

Biodegradable PLA materials are available from Nature-Works, LLC (Minnetonka, Minn.).

In embodiments, the number average molecular weight of the photochromatic composition may be in a range from about 5,000 to about 100,000 grams per mole, or from about 10,000 to about 200,000 grams per mole. In embodiments, the weight average molecular weight of the photochromatic composition may be in a range from about from about 10,000 to about 500,000 grams per mole, or from about 20,000 to about 200,000 grams per. Certain physical properties render the photochromatic composition suitable for use in 3D printing, these include a softening point ranging from about 50° C. to about 250° C., or from about 60° C. to about 200° C.; a viscosity of from about 200 centipoise to about 10,000 centipoise at 100° C. to about 200° C.; a Young's Modulus of from about 0.5 to about 5 gigapascals or from about 0.5 to about 2 gigapascals; a Yield Stress of from about 10 to about 100 megapascals or from about 10 to about 60 megapascals; a $T_g$ of from about 50° C. to about 200° C. or from about 60° C. to about 150° C.

In further embodiments, the photochromatic composition may further include an acid catalyst in an amount of from 0.1 weight percent to about 5 weight percent, or from about 0.5 weight percent to about 2 weight percent. In such embodiments, the acid catalyst may be selected from the group consisting of aliphatic carboxylic acids, such as acetic acid, chloroacetic acid, trichloroacetic acid, trifluoroacetic acid, oxalic acid, maleic acid, malonic acid, lactic acid and citric acid; aromatic carboxylic acids, such as benzoic acid, phthalic acid, terephthalic acid and trimellitic acid; aliphatic and aromatic sulfonic acids, such as methanesulfonic acid, dodecylsulfonic acid, benzenesulfonic acid, dodecylbenzenesulfonic acid, naphthalenesulfonic acid, p-toluenesulfonic acid, dinonylnaphthalenesulfonic acid (DNNSA), dinonylnaphthalenedisulfonic acid (DNNDSA) and phenolsulfonic acid; and phosphoric acid and mixtures thereof.

In embodiments, the polymeric component is derived from a recycled or biodegradable material.

In embodiments, the photochromatic composition is formed into a spool or granules for use in 3D printing.

In embodiments, there are provided methods of 3D printing comprising providing a photochromatic composition for use in 3D printing. The method may further comprise extruding the photochromatic composition to provide a filament, and supplying the filament to a heated nozzle to apply the photochromatic composition to a substrate to form an object on the substrate.

When 3D printing with the photochromatic composition disclosed herein there may be provided a support material. This material is generally removable and serves as a temporary support when making complex three-dimensional objects. Suitable support materials are well known in the art. See for example, U.S. Pat. No. 8,460,451 which is incorporated herein by reference in its entirety.

The support material may be delivered through the same or different print head as the photochromatic composition. The support material is often delivered as a liquid and typically comprises a hydrophobic chemical material that is solid at ambient temperature and liquid at elevated application temperatures. However, unlike the photochromatic composition, the support material is subsequently removed to provide the finished three-dimensional part.

Removal of the support material can be accomplished through several processes, including heating the support material to a temperature above its melting point in conjunction with the use of a suitable organic carrier to sufficiently remove the support material from the photochromatic composition.

In embodiments, a method of printing a three dimensional article comprises selectively depositing layers of a photochromatic composition, as disclosed herein, as a build material to form the three dimensional article on a substrate, the build material may optionally include a diluent. In embodiments, a method of printing a three dimensional article further comprises supporting at least one layer of the build material with a support material. Additionally, the build material and/or support material, in embodiments of methods described herein, is selectively deposited according to an image of the three dimensional article, the image being in a computer readable format.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

EXAMPLES

Example 1

This example describes the preparation and characterization of exemplary photochromatic components in accordance with embodiments herein.

Preparation of Photochromatic Core-Shell Component:

The photochromatic core-shell component is produced through a chemical drying process.

Preparation of Dispersion Comprising Photochromatic Core-Shell Component:

A photochromatic coating dispersion was prepared comprising Chameleon UVC P-Blue, a photochrome melamine resin core-shell component available from POLYCHROM Co., Ltd. (Gyeonggi-do, Korea), and a polylactide (PLA available from Sigman-Aldrich (St. Louis, Mo.)) in tetrahydrofuran (THF) with a weight ratio of 10/90 (about 20 wt % solid) using mechanical agitation. Other options include Chameleon-UVC P-Red, Chameleon-UVC P-violet and Chameleon-UVC P-yellow, all available from POLY-CHROM Co., Ltd.

Excellent dispersion quality was obtained with no settling in weeks. A small amount of acid catalyst (0.5 wt % of pTSA) may be optionally incorporated to accelerate the subsequent chemical bonding between the core-shell component and the polymeric matrix.

The coating dispersion was coated on a PET substrate via a draw bar coater, and the coated PET was dried at 140° C. for 5 minutes, and a colorless coating of about 20 μm was obtained. The coated PET was then exposed to UV light (HANOVIA, 125 watts, 365 nm), and instantly became blue. Half of the blue substrate was allowed to sit in the laboratory bench (office light) at ambient conditions, and the color change was monitored. No color change was observed in the first two (2) days, and subsequently the blue color began to faint. After five (5) days, the blue color was still much stronger than the colorless PET that was not exposed to UV light. The other half of the blue PET can be completely erased with heating at 140° C.

Preparation of Photochromatic Composition:

Mix and extrude the photochromatic core-shell component together with the polymeric component, for example, PLA. Feed 47.5 g of PCL polymer into a Haake mixer heated to 62° C. Gradually feed 2.5 g of Chameleon-UVC P-Red into the hopper, and compound the mixture at 30 RPM for 30 minutes. After 30 minutes, turn the Haake off, and remove the mixture from the mixer. After cooling, ground the mixture into fine pellets, and feed into the MFI instrument and equilibrate at 90° C. for 6 minutes. Next, extrude the material with a 17 kg weight through a 2 mm diameter die. A 1 m section of filament is generated. The co-extrusion produces the photochromatic composition. The heat during the mixing and extrusion processes will help chemically bond the photochromatic core-shell component onto the polymeric matrix. The chemical bonding can be further enhanced during the printing process when heat is applied.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims.

Unless specifically recited in a claim, steps or components of claims should not be implied or imported from the specification or any other claims as to any particular order, number, position, size, shape, angle, color or material.

All references cited herein are herein incorporated by reference in their entireties.

What is claimed is:
1. A photochromatic composition for three-dimensional printing, comprising:
   a photochromatic component have a core-shell structure, wherein the core comprises a photochromic compound and the shell comprises a polymeric resin; and
   a polymeric component comprising laywood, wherein the photochromatic component is dispersed within the polymeric component, and further wherein the photochromatic core comprises from about 50 to about 99.9 percent by weight of the total weight of the photochromatic component.

2. The photochromatic composition of claim 1, wherein the photochromic compound is selected from the group consisting of spiropyrans, spirooxazines, diarylenes, azo compounds and mixtures thereof.

3. The photochromatic composition of claim 1, wherein the polymeric resin of the shell is selected from the group consisting of melamine resin, urea resin, benzoguanamine resin, glycoluril resin, and mixtures thereof.

4. The photochromatic composition of claim 1, wherein the polymeric component is selected from the group consisting of acrylonitrile butadiene styrene (ABS), poly-lactic acid (PLA), nylon, polyethylene terephthalate (PET), polyvinyl alcohol (PVA), high impact polystyrene (HIPS), and mixtures thereof.

5. A photochromatic composition of claim 1 further including an acid catalyst.

6. The photochromatic composition of claim 1, wherein the polymeric shell comprises from about 0.1 to about 50 percent by weight of the total weight of the photochromatic component.

7. The photochromatic composition of claim 1, having a viscosity of from about 200 centipoise to about 10,000 centipoise at from about 100° C. to about 200° C.

8. The photochromatic composition of claim 1, having a Young's Modulus of from about 0.5 to about 5 gigapascals.

9. The photochromatic composition of claim 1, having a Tg of from about 50° C. to about 200° C.

10. A three-dimensional product comprising the photochromatic composition of claim 1.

11. The three-dimensional product of claim 10, wherein exposure to ultraviolet (UV) light colors the photochromic compound in the photochromatic composition.

12. The three-dimensional product of claim 11, wherein exposure to visible light and/or elevated temperatures de-colors the photochromic compound in the photochromatic composition.

13. The photochromatic composition of claim 10, further including an acid catalyst.

14. A photochromatic composition for three-dimensional printing, comprising:
   a photochromatic component have a core-shell structure, wherein the core comprises a photochromic compound and the shell comprises a polymeric resin, further wherein the photochromatic core comprises from about 50 to about 99.9 percent by weight of the total weight of the photochromatic component; and
   a polymeric component comprising laywood, wherein the photochromatic component is dispersed within the polymeric component and the photochromatic composition is formed into one or more filaments.

15. The photochromatic composition of claim 14, wherein the photochromic compound is selected from the group consisting of spiropyrans, spirooxazines, diarylenes, azo compounds and mixtures thereof and the polymeric resin of the shell comprises melamine resin.

16. The photochromatic composition of claim 14, wherein the photochromatic composition is formed into a spool for use in three-dimensional printing.

17. The photochromatic composition of claim 14, wherein exposure to ultraviolet (UV) light colors the photochromic compound in the photochromatic composition.

18. The photochromatic composition of claim 17, wherein exposure to visible light and/or elevated temperatures de-colors the photochromic compound in the photochromatic composition.

19. The photochromatic composition of claim 14, further including an acid catalyst.

20. A method of three-dimensional printing comprising:
providing a photochromatic composition for use in three-dimensional printing comprising:
a photochromatic component have a core-shell structure, wherein the core comprises a photochromic compound and the shell comprises a polymeric resin, wherein the photochromatic core comprises from about 50 to about 99.9 percent by weight of the total weight of the photochromatic component; and
a polymeric component comprising laywood, wherein the photochromatic component is dispersed within the polymeric component;
extruding the photochromatic composition to provide a filament; and
supplying the filament to a heated nozzle to apply the photochromatic composition to a substrate to form three-dimensional object on the substrate.

21. The photochromatic composition of claim 20, further including an acid catalyst.

* * * * *